J. McFatrick.
Addressing Machine.
No. 108,038.    Patented Oct. 4, 1870.
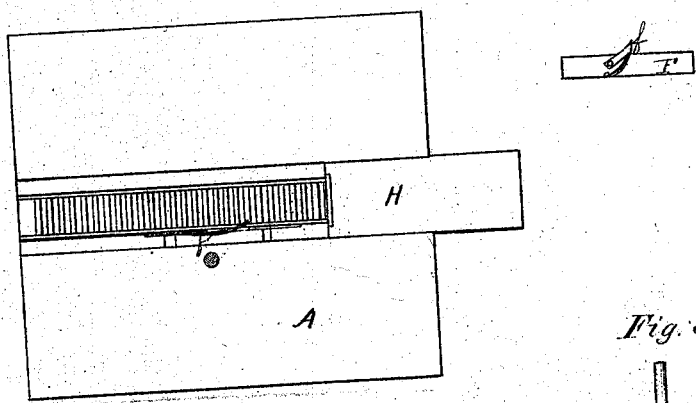
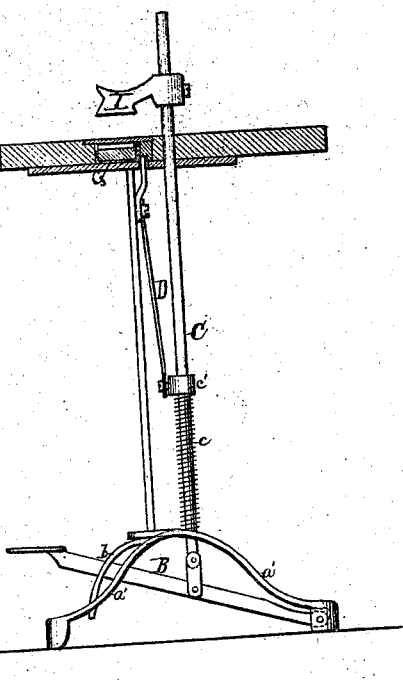
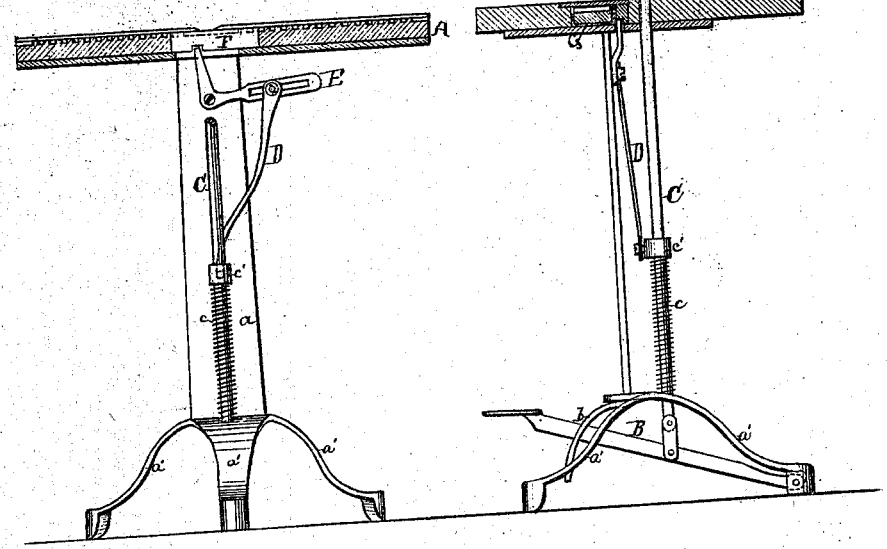
Witnesses:
S. J. Noyes
T. K. Pierson
Inventor:
Jas. McFatrick by
H. W. Beadle atty

D. McInroy,
Bustle.
No. 108,039.      Patented. Oct. 4, 1870.
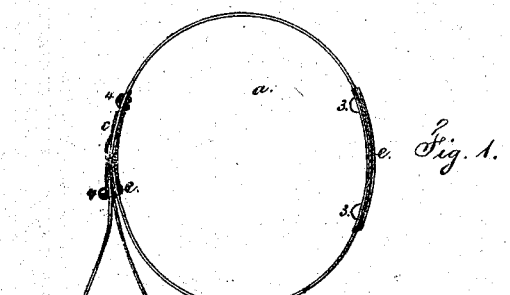
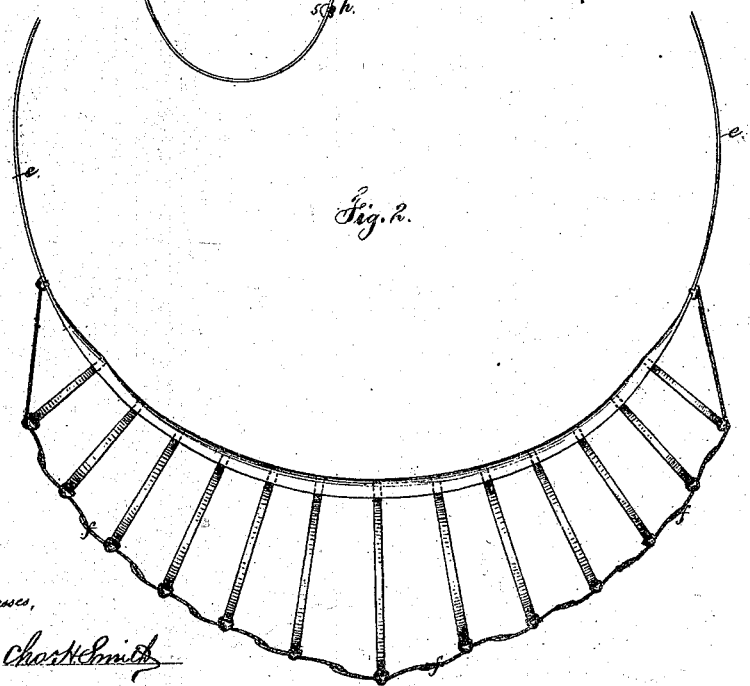
Donald McInroy
per L. W. Serrell atty.
Witnesses,
Chas H Smith
Geo. D Walker